April 13, 1943.  E. L. JARBOE  2,316,694

ATTACHMENT FOR CAMERAS

Filed June 8, 1940

INVENTOR.
ELMER L. JARBOE
BY Hoodling and Krost
ATTORNEY.

Patented Apr. 13, 1943

2,316,694

UNITED STATES PATENT OFFICE 2,316,694

ATTACHMENT FOR CAMERAS

Elmer L. Jarboe, Cleveland, Ohio; Harvey G. Oliver, administrator of said Elmer L. Jarboe, deceased, assignor to Esther V. Jarboe Application June 8, 1940, Serial No. 339,518

10 Claims. (Cl. 95—36)

My invention relates in general to attachments for cameras and more particularly to multiple exposure attachments capable when certain parts are removed to function as a lens shade and filter holder.

An object of my invention is the provision of a multiple exposure device wherein a number of exposures can be successfully made upon a single film or plate, thereby permitting the grouping of subjects of different poses and subject matters on a single negative for the production of pictures therefrom.

Another object of my invention is the provision of a multiple exposure device which enables the operator to accurately locate each individual exposure on the plate, so that the several exposures or views will all be positioned properly with respect to each other and to the film or plate.

Another object of my invention is the provision of a multiple exposure attachment which permits the operator to readily position the exposure upon any local region of the film or plate.

Another object of my invention is the provision of a multiple exposure device which when certain parts are removed the remaining parts function as a lens shade and filter holder.

Other objects and a fuller understanding of my invention may be had by referring to the following description and claims, taken in conjunction with the accompanying drawing, in wihch:

Figure 1:
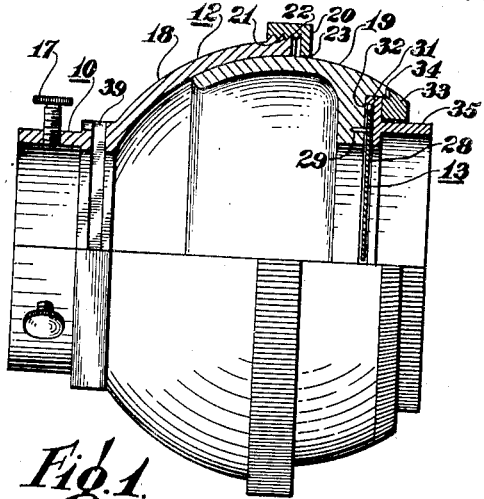
Figure 1 represents a side elevational view of my multiple exposure device for cameras, with the upper half of the device shown in section to illustrate the working parts thereof.

With reference to the drawing, my multiple exposure device comprises generally an attachment means 10, an adjustable light excluding means 12, and a ball-and-socket movable means 13. The attachment means 10 may be in the form of a hollow cylindrical member adapted to fit on the lens barrel of the camera and arranged to be securely fastened thereto by means of the thumb screw 17 extending radially inwardly of the attachment means 10.

The ball-and-socket movable means 13 comprises an outer semispherical portion 18 and an inner semi-spherical portion 19, both having complementary engaging surfaces to permit the inner semi-spherical portion 19 to be rotated within the outer semi-spherical portion 18. The left-hand end of the outer semi-spherical portion 18 is connected to the attachment means 10. The right-hand end of the inner semi-spherical portion 19 is adapted to carry or support the adjustable light excluding means 12. As illustrated, the inner semi-spherical portion 19 may be constrained or locked in a fixed position with reference to the outer semi-spherical portion 18 by means of a locking ring 20 having internal threads 22 which threadably engage external threads 21 on the peripheral surface of the right-hand end of the semi-spherical portion 18. The inner engaging surface 23 of the locking ring 20 is slightly smaller than the maximum diameter of the inner semi-spherical portion 19, so that as the locking ring 20 is turned on the threads the internal engaging surface 23 bears against the external surface of the inner semi-spherical portion 19 and constrains or locks it in a fixed position with reference to the outer semi-spherical portion 18. The outer surface of the locking ring 20 may be knurled to provide a good finger grip for operating same.

Figure 2:
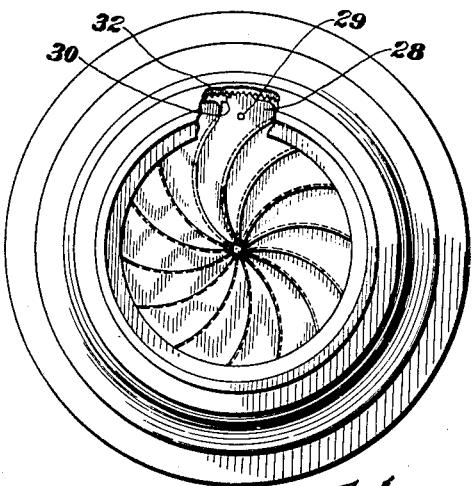
Figure 2 is a front elevational view of the device shown in Figure 1.

The adjustable light excluding means 12 comprises preferably a plurality of overlapping shutter leaves 28, each pivotally connected to a pivot pin 29 carried by the outer right-hand end of the inner semi-spherical portion 19. As illustrated, in Figures 2 and 5, the heel portion of each of the overlapping shutter leaves 28 is provided with a segment of gear teeth 30 which are arranged to be simultaneously operated by an annular actuating member 31 having internal gear teeth 32. As shown, the annular actuating member 31 may be held in position by means of a retaining ring 33 threadably engaging the outer end of the inner semi-spherical portion 19 by means of the threads 34. Extending from the annular actuating member 31 is a cylindrical portion projecting beyond the retaining ring 33 to present an actuating surface 35 whereby an operator may grasp the same and rotate the annular actuating member 31 for simultaneously operating the overlapping shutter leaves 28. The outer surface of the actuating surface 35 may be knurled to facilitate the gripping thereof by a person's fingers. With reference to Figure 2, the actuation of the actuating surface 35 in a clockwise direction causes the plurality of overlapping shutter leaves 28 to open and the actuation of the actuating surface 35 in a counter-clockwise direction causes the plurality of overlapping shutter leaves 28 to close. In actual practice, I find that the central opening of the overlapping shutter leaves 28 when in a closed position should be closed to at least $\frac{1}{16}$ of an inch, keeping in mind that it is not necessary to have an absolute enclosure as is the case with the shutter on the camera itself. The maximum opening of the overlapping shutter leaves should be sufficient to accommodate the largest size of the single exposure desired upon the film.

Figures 5, 6:
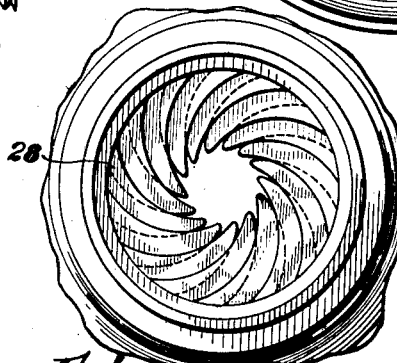
Figure 5 is a view of a single overlapping shutter leaf of my device.
Figure 6 is a view similar to Figure 2 with the outer parts removed, and showing the overlapping shutter leaves partly open.

In explaining the operation of my device, let it be assumed that the operator desires to take a series of individual exposures upon a single film or plate. The first step is to secure segregation of each exposure upon the film or plate. This may be done by taking, for example, a wax pencil and marking off a plurality of sections upon the glass of the vision finder of the camera. Then, in taking each individual exposure, the operator focuses the camera upon the subject matter to be taken and at the same time operates the knurled actuating surface 35 to adjust the size of the central opening in the overlapping shutter leaves 28 and adjusts the inner semi-spherical portion 19 until an alignment is made which localizes the exposure upon the desired section of the film or plate as observed through the vision finder. The range of movement of the inner semi-spherical portion 19 within the outer semi-spherical portion 18 is sufficient that the central opening of the overlapping shutter leaves 28 may be moved to any position to align the exposure upon any sectionalized portion of the film or plate. The dual adjustment afforded by varying the size of the opening of the overlapping shutter leaves 28 and by selectively positioning the ball-and-socket movable means 13 gives great flexibility in regulating the size and the position of each individual exposure upon the film or plate. In addition, the edge of each individual exposure may be somewhat irregular to make a good blend with the surrounding adjacent individual exposures, as produced by the irregular central opening as shown in Figure 6. That is to say, my invention produces a good blending of the individual exposures with each other because of the irregular peripheral edge of the central opening produced by the point of each of the overlapping shutter leaves 28.

Figure 7:
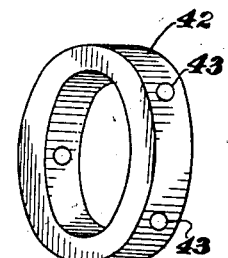
Figure 7 is a perspective view of an adapter for the lens barrel of the camera.

In Figure 7 I show a lens barrel adapter 42 which is arranged to fit within the internal surface of the attachment means 10 and accommodate cameras with different sized lens barrels. The attachment screws 17 are arranged to extend through openings 43 in the lens barrel adapter 42 and engage the lens barrel of the camera.

Figure 3:
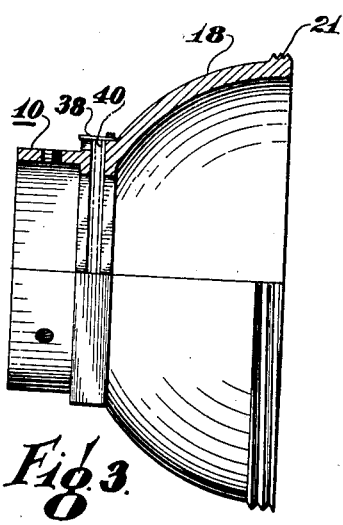
Figure 3 is a side elevational view of my multiple exposure device, with certain parts of the device removed in which the remaining parts function as a lens shade and filter holder.
Figure 4:
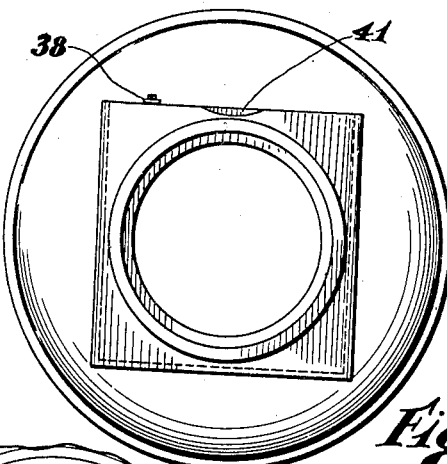
Figure 4 is a rear elevational view of the parts shown in Figure 3.

As mentioned hereinbefore, by removing certain parts of my multiple exposure device I am able to use the remaining parts for a lens shade and filter holder. Thus, Figures 3 and 4 show the adjustable light excluding means 12, the inner semi-spherical portion 19 and the locking ring 20 removed, leaving the attachment means 10 and the semi-spherical portion 18, which function as a lens shade and filter holder. The filter holder is incorporated in the attachment means 10 by making a transverse slotted opening 39 into which a filter 40 may be slidably inserted. The top edge of the portion surrounding the slotted opening 39 may be provided with a resilient latch clip 38 which holds the filter within the transverse slotted opening 39. As illustrated in Figure 4, the central portion of the upper edge of the material surrounding the slotted opening 39 may be removed to make a finger grip depression 41, so that the operator may grasp the upper edge of the filter between his thumb and index finger to remove same therefrom. The inner surface of the semi-spherical portion 18 may be sand-blasted or roughened to break up the reflection of the light. The filter 40 may also be used for taking a series of individual exposures, as hereinbefore described, upon the film or plate.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A multiple exposure device for cameras having a lens barrel wherein a number of individual exposures can be made upon a single film or plate comprising, in combination, attachment means for attachment to and removal from the camera, light excluding means, and hollow supporting means for movably supporting the light excluding means to the attachment means at a substantial distance ahead of the lens barrel, said supporting means comprising a hollow body connected to the attachment means, and a hollow body connected to the light excluding means, said hollow bodies excluding light from the camera lens except that which passes through the light excluding means and having spherical and complementary engaging surfaces one within the other to give movement of the light excluding means with reference to the lens barrel of the camera to direct the exposure upon a localized portion of the film or plate, said hollow bodies having an internal diameter greater than the internal diameter of the lens barrel to provide conduit means which unobstructs the direct passage of light rays passing through the light excluding means to the lens barrel for any and all of the angular positions of the light excluding means.

2. A multiple exposure device for cameras having a lens barrel wherein a number of individual exposures can be made upon a single film or plate comprising, in combination, attachment means for attachment to and removal from the camera, light excluding means, and hollow supporting means for movably supporting the light excluding means to the attachment means at a substantial distance ahead of the lens barrel, said supporting means comprising a hollow body connected to the attachment means, and a hollow body connected to the light excluding means, said hollow bodies excluding light from the camera lens except that which passes through the light excluding means and having spherical and complementary engaging surfaces one within the other to give movement of the light excluding means with reference to the lens barrel of the camera to direct the exposure upon a localized portion of the film or plate, and means for constraining the hollow bodies in a fixed position with reference to each other, said hollow bodies having an internal diameter greater than the internal diameter of the lens barrel to provide conduit means which unobstructs the direct passage of light rays passing through the light excluding means to the lens barrel for any and all of the angular positions of the light excluding means.

3. A multiple exposure device for cameras having a lens barrel wherein a number of individual exposures can be made upon a single film or plate comprising, in combination, attachment means for attachment to and removal from the camera, adjustable light excluding means, and hollow supporting means for movably supporting the adjustable light excluding means to the attachment means at a substantial distance ahead of the lens barrel, said supporting means comprising a hollow body connected to the attachment means, and a hollow body connected to the adjustable light excluding means, said hollow bodies excluding light from the camera lens except that which passes through the light excluding means and having spherical and complementary engaging surfaces one within the other to give movement of the adjustable light excluding means with reference to the lens barrel of the camera to direct the exposure upon a localized portion of the film or plate, and means for constraining the hollow bodies in a fixed position with reference to each other, said hollow bodies having an internal diameter greater than the internal diameter of the lens barrel to provide conduit means which unobstructs the direct passage of light rays passing through the light excluding means to the lens barrel for any and all of the angular positions of the light excluding means.

4. A multiple exposure device for cameras having a lens barrel wherein a number of individual exposures can be made upon a single film or plate comprising, in combination, attachment means for attachment to and removal from the camera, adjustable light excluding means, and hollow supporting means for movably supporting the adjustable light excluding means to the attachment means at a substantial distance ahead of the lens barrel, said supporting means comprising a hollow body connected to the attachment means, and a hollow body connected to the adjustable light excluding means, said hollow bodies excluding light from the camera lens except that which passes through the light excluding means and having spherical and complementary engaging surfaces one within the other to give movement of the adjustable light excluding means with reference to the lens barrel of the camera to direct the exposure upon a localized portion of the film or plate, and means for constraining the hollow bodies in a fixed position with reference to each other, said adjustable light excluding means comprising a plurality of shutter leaves and means for adjustably actuating the shutter leaves, said hollow bodies having an internal diameter greater than the internal diameter of the lens barrel to provide means which unobstructs the direct passage of light rays passing through the light excluding means to the lens barrel for any and all of the angular positions of the light excluding means.

5. A multiple exposure device for cameras having a lens barrel wherein a number of individual exposures can be made upon a single film or plate comprising, in combination, attachment means for attachment to and removal from the camera, adjustable light excluding means, and hollow supporting means for movably supporting the adjustable light excluding means to the attachment means at a substantial distance ahead of the lens barrel, said supporting means comprising a hollow body connected to the attachment means, and a hollow body connected to the adjustable light excluding means, said hollow bodies excluding light from the camera lens except that which passes through the light excluding means and having spherical and complementary engaging surfaces one within the other to give movement of the adjustable light excluding means with reference to the lens barrel of the camera to direct the exposure upon a localized portion of the film or plate, the outer of said hollow bodies having threaded means thereon, a locking ring threadably engaging the threaded means and having an internal surface engaging the inner of said hollow bodies and constraining the hollow bodies in a fixed position with reference to each other, said adjustable light excluding means comprising a plurality of over-lapping shutter leaves having a segment of gear teeth thereon, means for pivotally connecting the shutter leaves to the supporting means, an annular member rotatively mounted on the supporting means having internal gear teeth adapted to engage the segment of the gear teeth on the shutter leaves and actuate same to vary the size of the opening of the shutter leaves, and means for holding the annular member to the supporting means, said hollow bodies having an internal diameter greater than the internal diameter of the lens barrel to provide conduit means which unobstructs the direct passage of light rays passing through the light excluding means to the lens barrel for any and all of the angular positions of the light excluding means.

6. A multiple exposure device for cameras having a lens barrel wherein a number of individual exposures can be made upon a single film or plate comprising, in combination, attachment means for attachment to and removal from the camera, light excluding means, and hollow supporting means for movably supporting the light excluding means to the attachment means at a substantial distance ahead of the lens barrel, said supporting means comprising a hollow body connected to the attachment means, and a hollow body connected to the light excluding means, said hollow bodies excluding light from the camera lens except that which passes through the light excluding means and having spherical and complementary engaging surfaces one within the other to give movement of the light excluding means with reference to the lens barrel of the camera to direct the exposure upon a localized portion of the film or plate, said hollow body connected to the attachment means being separably adaptable as a shade for the lens of the camera, said hollow bodies having an internal diameter greater than the internal diameter of the lens barrel to provide conduit means which unobstructs the direct passage of light rays passing through the light excluding means to the lens barrel for any and all of the angular positions of the light excluding means.

7. A multiple exposure device for a camera having a lens barrel wherein a number of individual exposures can be made upon a single film or plate comprising, in combination, hollow attachment means for removable attachment to the camera, light excluding means, and hollow ball-and-socket means including two spherical elements having complementary engaging surfaces for movably supporting the light excluding means to the attachment means at a substantial distance ahead of the lens barrel, said hollow ball-and-socket means excluding light from the camera lens except that which passes through the light excluding means and being universally adjustable to facilitate the angular positioning of the light excluding means with reference to the lens barrel of the camera to direct the exposure upon a localized portion of the film or plate, said spherical elements having an internal diameter greater than the internal diameter of the lens barrel to provide conduits means which unobstructs the direct passage of light rays passing through the light excluding means to the lens barrel for any and all of the angular positions of the light excluding means.

8. A multiple exposure device for a camera having a lens barrel wherein a number of individual exposures can be made upon a single film or plate comprising, in combination, hollow attachment means for removable attachment to the camera, adjustable light excluding means, and hollow ball-and-socket means including two spherical elements having complementary engaging surfaces for movably supporting the light excluding means to the attachment means at a substantial distance ahead of the lens barrel, said hollow ball-and-socket means excluding light from the camera lens except that which passes through the light excluding means and being universally adjustable to facilitate the angular positioning of the light excluding means with reference to the lens barrel of the camera to direct the exposure upon a localized portion of the film or plate, said spherical elements being substantially concentric with the axis of the camera lens and having an internal diameter greater than the internal diameter of the lens barrel to provide conduit means which unobstructs the direct passage of light rays passing through the light excluding means to lens barrel for any and all of the angular positions of the light excluding means.

9. A multiple exposure device for a camera having a lens barrel wherein a number of individual exposures can be made upon a single film or plate comprising, in combination, hollow attachment means for removable attachment to the camera, adjustable light excluding means, and hollow supporting means including two spherical elements having complementary engaging surfaces for movably supporting the light excluding means to the attachment means at a substantial distance ahead of the lens barrel, said hollow supporting means excluding light from the camera lens except that which passes through the light excluding means and being readily adjustable to facilitate the angular positioning of the light excluding means with reference to the lens barrel of the camera to direct the exposure upon a localized portion of the film or plate, said spherical elements being substantially concentric with the axis of the camera lens and having an internal diameter greater than the internal diameter of the lens barrel to provide conduit means which unobstructs the direct passage of light rays passing through the light excluding means to the lens barrel for any and all of the angular positions of the light excluding means.

10. A multiple exposure device for a camera having a lens barrel wherein a number of individual exposures can be made upon a single film or plate comprising, in combination, hollow attachment means for removable attachment to the camera, adjustable light excluding means, and hollow ball-and-socket means including two spherical elements having complementary engaging surfaces for movably supporting the light excluding means to the attachment means at a substantial distance ahead of the lens barrel, said hollow ball-and-socket means excluding light from the camera lens except that which passes through the light excluding means and being universally adjustable to facilitate the angular positioning of the light excluding means with reference to the lens barrel of the camera to direct the exposure upon a localized portion of the film or plate, and means to constrain the hollow ball-and-socket means in a fixed position, said spherical elements being substantially concentric with the axis of the camera lens and having an internal diameter greater than the internal diameter of the lens barrel to provide conduit means which unobstructs the direct passage of light rays passing through the light excluding means to the lens barrel for any and all of the angular positions of the light excluding means.

ELMER L. JARBOE.